(12) United States Patent
Schneider et al.

(10) Patent No.: US 7,410,697 B2
(45) Date of Patent: Aug. 12, 2008

(54) METHODS FOR MATERIAL FABRICATION UTILIZING THE POLYMERIZATION OF NANOPARTICLES

(75) Inventors: Thomas W. Schneider, Oakton, VA (US); Robert C. White, Fairfax, VA (US)

(73) Assignee: Science Applications International Corporation, San Diego, CA (US)

( * ) Notice: Subject to any disclaimer, the term of this patent is extended or adjusted under 35 U.S.C. 154(b) by 638 days.

(21) Appl. No.: 10/948,339

(22) Filed: Sep. 24, 2004

(65) Prior Publication Data

US 2005/0059755 A1    Mar. 17, 2005

Related U.S. Application Data

(63) Continuation of application No. 09/985,189, filed on Nov. 1, 2001, now Pat. No. 6,812,268.

(51) Int. Cl.
*B32B 27/02* (2006.01)
*C08K 9/06* (2006.01)

(52) U.S. Cl. ............... 428/372; 428/394; 523/205; 977/DIG. 1

(58) Field of Classification Search ............... 428/394, 428/372; 523/205
See application file for complete search history.

(56) References Cited

U.S. PATENT DOCUMENTS

| | | | |
|---|---|---|---|
| 3,519,538 A | 7/1970 | Messing et al. | 195/63 |
| 3,783,101 A | 1/1974 | Tomb et al. | 195/63 |
| 4,122,136 A | 10/1978 | Korte et al. | 525/222 |
| 5,618,872 A | 4/1997 | Pohl et al. | 524/430 |
| 5,777,049 A | 7/1998 | Geddes et al. | 526/64 |
| 5,976,998 A * | 11/1999 | Sandor et al. | 442/365 |
| 6,090,746 A | 7/2000 | Bonnemann et al. | 502/325 |
| 6,127,028 A * | 10/2000 | Sandor et al. | 428/222 |
| 6,162,538 A * | 12/2000 | LaNieve et al. | 428/373 |
| 6,210,798 B1 * | 4/2001 | Sandor et al. | 428/364 |
| 6,746,508 B1 * | 6/2004 | Deevi et al. | 75/255 |
| 2003/0013369 A1 * | 1/2003 | Soane et al. | 442/181 |
| 2003/0106160 A1 * | 6/2003 | Sun et al. | 8/115.51 |

OTHER PUBLICATIONS

Duffy, et al., "Rapid Prototyping of Microfluidic Systems in Poly(dimethylsiloxane)," *Anal. Chem.*, vol. 70, pp. 4974-4984, Dec. 1, 1998.
Gerhartz, "Ullman's Encyclopedia of Industrial Chemistry," vol. A11, VCH, pp. 1-84, 1988.
Post, E., et al., N., "E-Broidery: Design and Fabrication of Textile-Based Computing," *IBM Systems Journal*, vol. 39, p. 840, 2000.
Weiss, P., "Smart Outfit," *Science News*, vol. 156, No. 21, p. 330, 1999.
Proceedings of the Fourth International Symposium on Wearable Computers (ISWC'00), Oct. 18-21, 2000, Atlanta, Georgia, IEEE Computer Society.
Forrest, D., "The Future Impact of Molecular Nanotechnology on Textile Technology and on the Textile Industry," presented at Discover Expo '95, Industrial Fabric & Equipment Exposition, Charlotte, NC, Oct. 1995.
Warner, S., "Fiber Science," Prentice Hall, 1995.
Balachandran, R., Pacheco, D., Lawandy, M., "Photonic Textile Fibers," *Appl. Optics*, vol. 35, pp. 1991-1994, 1996.
Xiaonan, Li, et al., "Effect of Nitric-Phosphoric Acid Etches on Material Properties and Back-Contact Formation of CdTe-Based Solar Cells," *J. Vac. Sci. Technol.*, A 17(3), pp. 805-809, May/Jun., 1999.

* cited by examiner

*Primary Examiner*—Tae H. Yoon
(74) *Attorney, Agent, or Firm*—King & Spalding LLP

(57) ABSTRACT

The present invention relates generally to novel systems and methods for polymerizing nanoparticles within a polymer matrix and to novel methods for fabricating materials containing nanoparticles in a polymer matrix.

10 Claims, 3 Drawing Sheets

METHODS FOR MATERIAL FABRICATION UTILIZING THE POLYMERIZATION OF NANOPARTICLES

CROSS-REFERENCE TO RELATED APPLICATIONS

This application is a continuation of U.S. patent application Ser. No. 09/985,189, filed Nov. 1, 2001 now U.S. Pat. No. 6,812,268, which is incorporated herein by reference in its entirety.

BACKGROUND OF THE INVENTION

1. Field of the Invention

The present invention relates generally to novel systems and methods for polymerizing nanoparticles within a polymer matrix and to novel methods for fabricating materials containing nanoparticles in a polymer matrix.

2. Description of the Related Art

Polymers are substances made of "many parts". In most cases the parts are small molecules which react with each other to form a larger molecule having hundreds, thousands, or millions of the small molecules linked together. A molecule used in producing a polymer is a monomer. A polymer made entirely from molecules of one monomer is referred to as a homopolymer. Chains that contain two or more different repeating monomers are copolymers.

The resulting molecules may be long, straight chains, or they may be branched, with small chains extending out from the molecular backbone. The branches also may grow until they join with other branches to form a huge, three-dimensional matrix. Variants of these molecular shapes are among the most important factors in determining the properties of the polymers created.

The size of polymer molecules is important. This is usually expressed in terms of molecular weight. Since a polymeric material contains many chains with the same repeating units, but with different chain lengths, average molecular weight must be used. In general, higher molecular weights lead to higher strength. But as polymer chains get bigger, their solutions, or melts, become more viscous and difficult to process.

Life as we know it could not exist without polymers. Proteins, with large numbers of amino acids joined by amide linkages, perform a wide variety of vital roles in plants and animals. Carbohydrates, with chains made up of repeating units derived from simple sugars, are among the most plentiful compounds in plants and animals. Both of these natural polymers are important fibers. Proteins are the basis for wool, silk and other animal-derived filaments. Cellulose as a carbohydrate occurs as cotton, linen and other vegetable fibers. The naturally occurring form of the base polymers limits the properties of these fibers. Some, like linen and silk, are difficult to isolate from their sources, which makes them scarce and expensive. There are, of course, many other sources of proteins and cellulose. Wood pulp is an example of a cellulose source. Natural polymers, however, tend to be very difficult to work with and form into fibers or other useful structures. The inter-chain forces can be strong because of the large number of polar groups in the molecular chains. Thus, natural polymers usually have melting points that are so high that they degrade before they liquefy.

The most useful molecules for fibers are long chains with few branches and a very regular, extended structure. Thus, cellulose is a good fiber-former. It has few side chains or linkages between the sugar units forcing its chains into extended configurations. However, starches, which contain the same basic sugar units, do not form useful fibers because their chains are branched and coiled into almost spherical configurations. Synthetic polymers offer more possibilities, since they can be designed with molecular structures that impart properties for desired end uses. Many of these polymers are capable of dissolving or melting, allowing them to be extruded into the long, thin filaments needed to make most textile products.

Synthetic polymer fibers can be made with regular structures that allow the chains to pack together tightly, a characteristic that gives filaments good strength. Thus, filaments can be made from some synthetic polymers that are much lighter and stronger than steel. Bullet-proof vests are made from synthetic fibers.

There are two basic chemical processes for the creation of synthetic polymers from small molecules: (1) condensation, or step-growth polymerization and (2) addition, or chain-growth polymerization.

In step-growth polymerization, monomers with two reactive ends join to form dimers (two parts joined together), then "trimers" (three parts), and so on. However, since each of the newly formed oligomers (short chains containing only a few parts) also has two reactive ends, they can join together; so a dimer and a trimer would form a pentamer (five repeating parts). In this way the chains may quickly great length achieve large size. This form of step-growth polymerization is used for the manufacture of two of the most important classes of polymers used for textile fibers, polyamide (commonly known as nylon), and polyester.

There are many different commercial versions of polyester in a wide variety of applications, including plastics, coatings, films, paints, and countless other products. The polymer usually used for textile fibers is poly(ethylene terephthalate), or PET, which is formed by reacting ethylene glycol with either terephthalic acid or dimethyl terephthalate. Antimony oxide is usually added as a catalyst, and high vacuum is used to remove the water or methanol byproducts. High temperature (>250° C.) is necessary to provide the energy for the reaction, and to keep the resultant polymer in a molten state.

PET molecules are regular and straight, so their inter-chain forces are strong—but not strong enough to prevent melting. PET chains are long and "rigid" and their inter-chain forces, while somewhat strong, do not allow for significant alignment of groups on the chain that would interact strongly with other chains. In contrast, with cellulose the inter-chain forces are almost as strong as the hydrogen bonding that occurs in water. Thus, PET is a "thermoplastic" material; that is, it can be melted and then solidified to form specific products. Since its melting point is high, it does not soften or melt at temperatures normally encountered in laundering or drying. Another important property of PET is its Tg, or "glass transition temperature". When a polymer is above its glass transition temperature, it is easy to change its shape. Below its Tg, the material is dimensionally stable and it resists changes in shape. This property is very important for textile applications because it allows some fibers, and the fabrics made from them, to be texturized or heat-set into a given shape. This can provide bulk to the yarn, or wrinkle resistance to the fabric. These set-in shapes remain permanent as long as the polymer is not heated above its Tg. Because its chains are closely packed and its ester groups do not form good hydrogen bonds, polyesters are also hydrophobic (i.e., they do not absorb water). This property also requires special dyeing techniques.

There are also many important classes of synthetic polyamides (nylons) and they have a wide variety of commercial uses. These are usually distinguished from each other by names based on the number of carbon atoms contained in their monomer units. As with polyesters, polyamides are formed by step-growth polymerization of monomers possessing two reactive groups. Here, the reactive functions are acids and amines. The monomers used may have their two reactive functions of the same chemical type (both acids, or both amines), or of different types. Thus, nylon 6,6—a very common fiber polymer—is made by reacting molecules of adipic acid (containing six carbons in a chain, with an acid function at each end) with hexamethylene diamine (also six carbon atoms, with amine functions at each end). In another variant the diamine contains ten carbons atoms, the product designated nylon 6,10.

The other common polyamide fiber polymer is nylon 6. Its monomer has six carbons in the chain, with an amine at one end and an acid at the other. Thus only one form of monomer is needed to carry out the reaction. Commercial production of nylon 6 makes use of caprolactam, a derivative that provides the same result.

As with the polyesters, nylons have regular structures that permit good inter-chain forces, imparting high strength. Both nylon 6 and nylon 6,6 have melting points similar to PET, but have a lower Tg. Also, since the amide functions in nylon chains are good at hydrogen bonding, nylons can be penetrated by water molecules. This allows them to be dyed from aqueous media, unlike their polyester counterparts.

In addition to nylon, there is another commercially important group of synthetic polyamides. These are the aramids, which contain aromatic rings as part of their polymer chain backbone. Due to the stability of their aromatic structures and their conjugated amide linkages, the aramids are characterized by exceptionally high strength and thermal stability. Their usefulness for common textile applications is limited by their high melting points and by their insolubility in common solvents. They are expensive to fabricate, and they carry an intrinsic color that ranges from light yellow to deep gold.

The polyurethanes, another group of step-growth polymers, are produced by the reaction of polyols and polyisocyanates. For fiber purposes, this class of linear polymers is formed from glycols and diisocyanates. Usually, the reactions are carried out to form block copolymers containing at least two different chemical structures—one rigid, and the other flexible. The flexible segments stretch, while the rigid sections act as molecular anchors to allow the material to recover its original shape when the stretching force is removed. Varying the properties of the segments, and the ratio of flexible to rigid segments controls the amount of stretch. Fibers made in this way are classified as spandex and they are used widely in apparel where stretch is desirable.

Chain-growth polymerization occurs when an activated site on a molecule, such as a free radical or ion, adds to a double bond, producing a new bond and a new activated location. That location then attacks another double bond, adding another unit to the chain, and a new reactive end. The process may be repeated thousands, or millions, of times, to produce very large molecules. This is usually a high energy process and the intermediate species are so reactive that, in addition to attacking available monomer, they also may attack other chains, producing highly branched structures. Since these branches prevent the molecules from forming regular structures with other molecules, their inter-chain forces are weak. The resulting polymers tend to be low-melting and waxy.

The breakthrough in making chain-growth polymers useful for fibers and for most commercial plastics came with the development of special selective catalysts that drive the production of long, straight polymer chains from monomers containing basic carbon-to-carbon double bonds. Ethylene and propylene form the simplest chain-growth polymers. Since their polymer chains contain no polar groups, these polyolefins must rely on close contact between the molecular chains for strength. Thus, the physical characteristics of polyethylene are very sensitive to even a small number of chain branches. Very straight chains of polyethylene can form strong crystalline structures that exhibit exceptional strength. Protective fabrics made from this type of highly structured polyethylene are virtually impossible to penetrate or cut.

Polypropylene is more complicated. Even without chain branching, each monomer unit adds one methyl group pendant to the chain. The arrangement of these side groups is described as the "tacticity" of the polymer. A random arrangement is considered "atactic", or without tacticity. Regular arrangement with all side groups on one side of the chain is "isotactic", and a regular alternating structure is "syndiotactic". Polypropylene molecules can only pack closely in an isotactic arrangement. Synthesis of these polymers was a major challenge, but several stereoselective catalysts are now available, and high-density polypropylene has become a commodity product. Fibers made from it are lightweight, hydrophobic and highly crystalline. Their resistance to wetting gives them good moisture wicking and anti-staining properties. This also makes them virtually undyeable, except when the dye is applied to the polymer in its molten state—a process know as solution dyeing.

By contrast, the pendant nitrile functions in polyacrylonitrile are sufficiently polar to produce very strong inter-chain forces. Pure homopolymers from acrylonitrile are non-thermoplastic and difficult to dissolve or dye. Thus, for most commercial acrylonitrile polymers, small amounts of other monomers with bulky side chains are introduced to force the chains apart, to reduce the inter-chain forces. Common co-monomers for these fiber applications include vinyl chloride, vinyl acetate, acrylic acid, and methyl acrylate.

There are also a number of complex, specialty fiber polymers with methods of synthesis that are not easily classified. These materials are occasionally used in high performance materials where the complex structures impart exceptional strength, thermal stability, electrical conductivity, and others desirable properties. They include PBI (polybenzimidazole) and sulfur.

Most synthetic and cellulosic manufactured fibers are created by "extrusion"—forcing a thick, viscous liquid (about the consistency of cold honey) through the tiny holes of a device called a spinneret to form continuous filaments of semi-solid polymer.

In their initial state, the fiber-forming polymers are solids and therefore must be first converted into a fluid state for extrusion. This is usually achieved by melting, if the polymers are thermoplastic synthetics (i.e., they soften and melt when heated), or by dissolving them in a suitable solvent if they are non-thermoplastic cellulosics. If they cannot be dissolved or melted directly, they must be chemically treated to form soluble or thermoplastic derivatives. Recent technologies have been developed for some specialty fibers made of polymers that do not melt, dissolve, or form appropriate derivatives. For these materials, the small fluid molecules are mixed and reacted to form the otherwise intractable polymers during the extrusion process. Most manufactured fibers are produced using a spinneret, a metal cap with minute holes, through which a polymer is forced under pressure to produce fibers.

The spinnerets used in the production of most manufactured fibers are similar, in principle, to a bathroom shower head. A spinneret may have from one to several hundred holes. The tiny openings are very sensitive to impurities and corrosion. The liquid feeding them must be carefully filtered (not an easy task with very viscous materials) and, in some cases, the spinneret must be made from very expensive, corrosion-resistant metals. Maintenance is also critical, and spinnerets must be removed and cleaned on a regular basis to prevent clogging.

As the filaments emerge from the holes in the spinneret, the liquid polymer is converted first to a rubbery state and then solidified. This process of extrusion and solidification of endless filaments is called spinning, not to be confused with the textile operation of the same name, where short pieces of staple fiber are twisted into yarn. There are four methods of spinning filaments of manufactured fibers: wet, dry, melt, and gel spinning.

Wet spinning is the oldest process. It is used for fiber-forming substances that have been dissolved in a solvent. The spinnerets are submerged in a chemical bath and, as the filaments emerge, the filaments precipitate from solution and solidify. Because the solution is extruded directly into the precipitating liquid, this process for making fibers is called wet spinning. Acrylic, rayon, aramid, modacrylic and spandex can be produced by this process.

Dry spinning is also used for fiber-forming substances in solution. However, instead of precipitating the polymer by dilution or chemical reaction, solidification is achieved by evaporating the solvent in a stream of air or inert gas. The filaments do not come in contact with a precipitating liquid, eliminating the need for drying and easing solvent recovery. This process may be used for the production of acetate, triacetate, acrylic, modacrylic, PBI, spandex, and vinyon.

In melt spinning, the fiber-forming substance is melted for extrusion through the spinneret and then directly solidified by cooling. Nylon, olefin, polyester, saran and sulfur are produced in this manner. Melt spun fibers can be extruded from the spinneret in different cross-sectional shapes (round, trilobal, pentagonal, octagonal, and others). Trilobal-shaped fibers reflect more light and give an attractive sparkle to textiles. Pentagonal-shaped and hollow fibers, when used in carpet, show less soil and dirt. Octagonal-shaped fibers offer glitter-free effects. Hollow fibers trap air, creating insulation and provide loft characteristics equal to, or better than, down.

Gel spinning is a special process used to obtain high strength or other special fiber properties. The polymer is not in a true liquid state during extrusion. Not completely separated, as they would be in a true solution, the polymer chains are bound together at various points in liquid crystal form. Strong inter-chain forces cause liquid crystal alignments between molecules, resulting in an increased tensile strength of the fibers. In addition, the liquid crystals are aligned along the fiber axis by the shear forces during extrusion. The filaments emerge with an unusually high degree of orientation relative to each other, further enhancing their strength. The process can also be described as dry-wet spinning, since the filaments first pass through air and then are cooled further in a liquid bath. Some high-strength polyethylene and aramid fibers are produced by gel spinning.

While extruded fibers are solidifying, or in some cases even after they have hardened, the filaments may be drawn to impart strength. Drawing pulls the molecular chains together and orients them along the fiber axis, creating a considerably stronger yarn. It will be appreciated that filler materials, such as inorganic fillers, can be added to polymeric matrices, more specifically, to polymeric fibers so as to confer a variety of desired chemical and physical properties.

For example, U.S. Pat. No. 5,618,872, issued to Pohl et al. discloses the use of monodisperse, non-porous, spherical particles based on $SiO_2$, $TiO_2$, $ZrO_2$, $Al_2O_3$, $V_2O_5$, $Nb_2O_5$ or mixed systems thereof, which are optionally modified on the surface by covalently bonded organic groups, as fillers in organic matrix materials, the refractive index of the particles being adapted to the refractive index of the organic matrix according to the use.

Nano-phase or nano-structured materials, i.e., nanoparticles or materials with grain sizes less than about 100 m (0.1 µm), are of great interest because such materials have properties different from and often superior to those of conventional bulk materials. Examples include greater strength, hardness, ductility, and sinterability; size dependent light absorption, greater reactivity among others. There has been considerable progress in determining the properties of nano-phase materials, small amounts of which have been synthesized (mainly as nano-size powders) by a number of processes including colloidal precipitation, mechanical grinding, and gas-phase nucleation and growth. Extensive reviews have documented recent developments in nano-phase materials. See Gleiter, H. (1989) "Nano-crystalline materials," Prog. Mater. Sci. 33:223-315 and Siegel, R. W. (1993) "Synthesis and properties of nano-phase materials," Mater. Sci. Eng. A168:189-197.

The potential applications of nano-phase materials include wear resistant coatings, thermal barrier coatings, ductile ceramics, new electronic and optical devices, and catalysts, among others. However, before the benefits of this emerging technology can be realized in the form of commercial products, two challenging problems need to be addressed, namely, (1) controlled, high-rate synthesis of nano-size powders, and (2) assembly of these powders into nano-structured materials. Controlled synthesis implies that the particles are uniform in size, composition and morphology, and are substantially unagglomerated, and generally requires that the consolidation or assembly be done in-situ to avoid contamination or to control the "nano-structure" of the resulting material. Nanoparticles have been made from metals (for example, Pd, Cu, Fe, Ag, Ni), intermetallics (for example, $Al_{52}Ti_{48}$), and metal oxides (for example, $TiO_2$, $Y_2O_3$, ZnO, MgO, $Al_2O_3$).

Interest in nanoparticles has grown over the last two decades because of the unusual properties these particles possess, properties that generally arise from the large surface area to volume ratios of the particles, but also from their size. Once formed, the nanoparticles can be used in a powder form, used as a coating material, or condensed into nano-phase materials. If denser nano-phase materials are desired than achievable through cold pressing, the nano-phase particles can be condensed using a hot pressing technique or sintered after the initial cold pressing step.

Nano-phase materials exhibit a variety of properties. For example, nano-phase metals have been reported with a yield stress and microhardness of three to five times greater than the same metals processed using conventional techniques. Nano-phase ceramics exhibit vastly improved ductility and malleability. One producer of nano-phase ceramics has demonstrated plastic, if not superplastic, deformability of a $TiO_2$ nano-phase sample by pressing a cylinder of the material into a disk. The compressed disk did not exhibit any cracks or flaws.

Particle formation techniques include chemical and physical vapor deposition, mechanical attrition, gas phase pyrolysis and condensation, electrodeposition, cryochemical synthesis, laser pyrolysis, and gel synthesis. These techniques typically produce quantities on the order of grams per hour, quantities that are sufficient for research, but generally insufficient for most commercial applications.

However, such use of nanoparticles in polymeric matrices does not provide control of particle spacing within a polymer fiber. Accordingly, there remains a need for systems and methods by which nanoparticles can be controllably spaced within polymeric fibers.

BRIEF SUMMARY OF THE INVENTION

The present invention pertains to a system and method for providing polymeric fibers in which nanoparticles are controllably spaced.

The present invention also pertains to a system and method for providing polymeric fibers in which nanoparticles are maintained in a dispersed state.

The present invention further pertains to a method for utilizing hydrodynamic focusing of fluid within a liquid flow reactor to control fiber processing.

The present invention also pertains to a system comprising a nested liquid flow reactor to build fibers with controlled structure at the nanometer to micron dimension.

This has been accomplished by means of a method of constructing nanoparticle-containing polymers comprising the steps of derivatizing nanoparticles such that the nanoparticles present functional groups which can react in a polymerization reaction and reacting the derivatized nanoparticles with a monomer in a laminar flow reactor to yield a constructing nanoparticle-containing polymer.

DETAILED DESCRIPTION OF THE INVENTION

Figure 1:
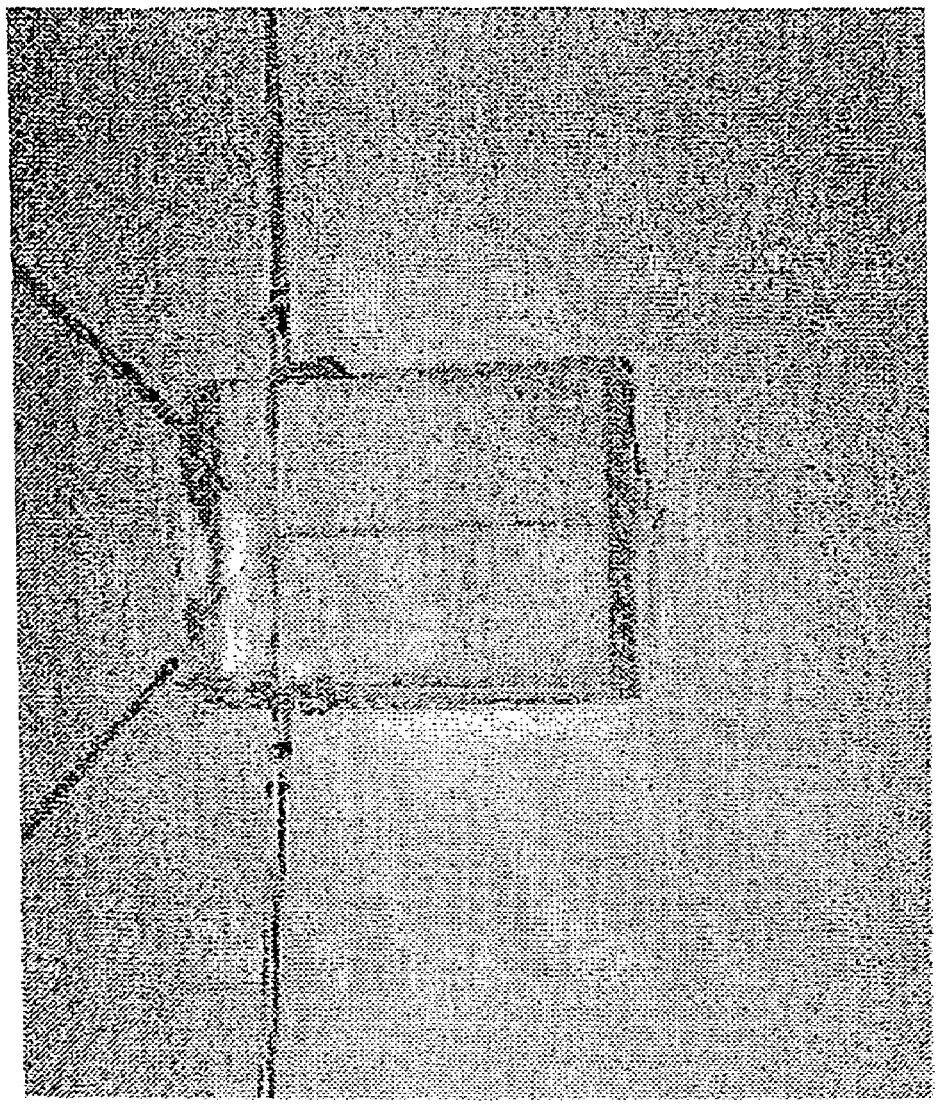
FIG. 1 illustrates a flow reactor constructed by rapid prototyping in polydimethylsiloxane.

One aspect of the present invention is a method to effect polymerization of nanoparticles within a polymer matrix.

Nanoparticles are material particles whose average diameter falls in the range of nanometers. In principle, this includes particles with diameter on the order of hundreds of nanometers and extends to particles with diameter on the order of 1 nm. Nanoparticles comprised of polymers, inorganic molecules, metal oxides and/or metals bearing a thin oxide coating or surface hydroxyl groups will be amenable for surface reaction to a functionalization agent. The nanoparticle will be surface functionalized using a silane or other surface attachment chemistry to introduce surface functional groups to allow for specific polymerization.

In one preferred embodiment of the present invention, the polymerization of nanoparticles is achieved by modification of the surface of the nanoparticles with a silane. The silane contains a functional group that can be incorporated into the polymer matrix. For example, a nanoparticle comprised of silica ($SiO_2$) can be chemically modified to prepare surface hydroxyl groups (Si—O—H) on its surface. The surface hydroxyl groups function to attach the silane to the nanoparticle. Any nanoparticle can be used in this step (for example, metal with a thin coat of oxide, metal oxides, polymers, quantum dots, among others) provided that surface hydroxyl groups can be formed on its surface.

For example with a nanoparticle containing surface hydroxyl groups, a silane, such as 3-aminopropyl trichlorosilane, can be reacted with the nanoparticle to provide amine functional groups at the particle/air interface. The reactive silane utilized in this instance is a trichlorosilane, but a variety of other silanes can also be used (for example, monochlorosilane, dichlorosilane, methoxysilane, dimethoxysilane, trimethoxysilane, ethoxysilane, diethoxysilane, triethoxysilane, among others). The amine functionality is also merely exemplary and a number of other functionalities (functional groups), for example, hydroxyl, chloro, bromo, iodo, epoxide, siloxane, among others, can be employed so as to allow for polymerization reactions.

In one embodiment, the silane-coated nanoparticle containing amine functionalities is used as a monomer in the polymerization process and is further reacted with a second monomer, a diacid chloride to form a polymer. The polymerization described in this example is a step-reaction (condensation) polymerization resulting in a polyamide.

In this embodiment, the amide condensation reaction occurs at the interface of an aqueous and an organic liquid. The aqueous phase contains the amine functionalized nanoparticle and the organic phase contains a diacid chloride. In this case, terephthaloyl chloride is used but many others may also be used to control particle spacing, for example, adipoyl chloride, suberoyl chloride, sebacoyl chloride, among others.

Another aspect of the present invention is a liquid flow reactor for synthesis of polymer fibers. Such a reactor directs the polymerization reaction to the center of a flowing stream restrained in microchannels, in a process that can be referred to as hydrodynamic focusing. Such a process creates thin polymeric fibers. The physical characteristics of the polymeric fiber result from reactor architecture, fluid dynamics of the reactant streams and flow rates of particles and monomer starting materials.

Figure 2:
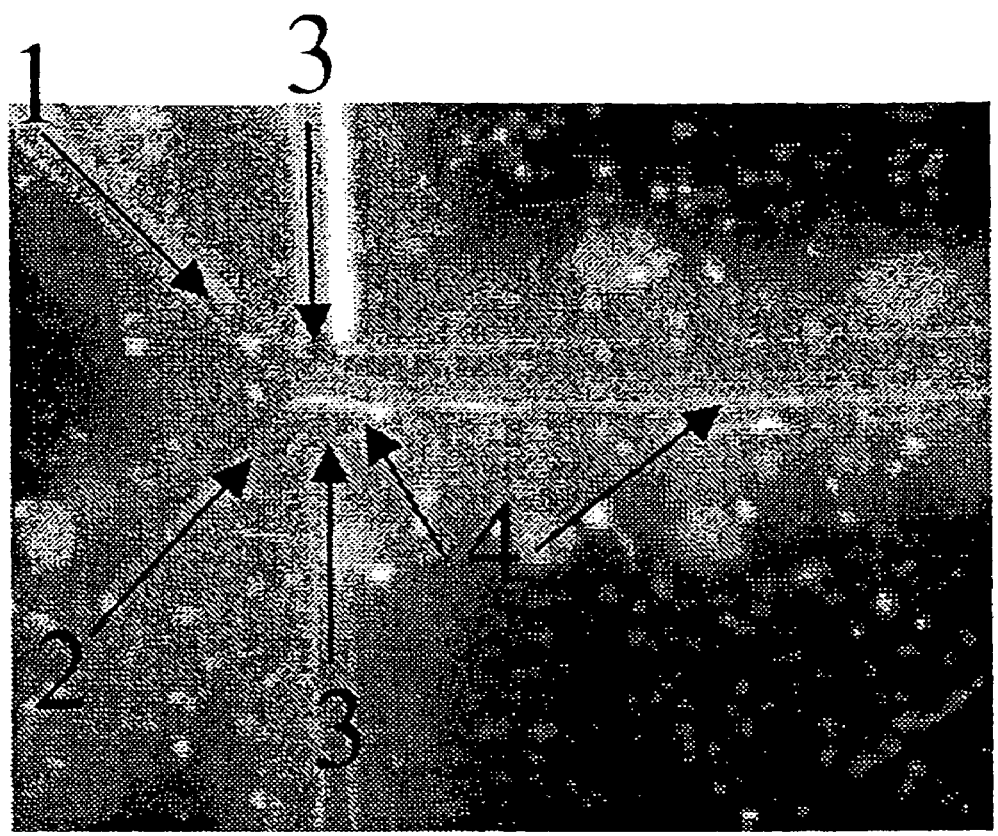
FIG. 2 illustrates a magnified view of the flow reactor which is producing a nylon fiber.

A flow reactor that is fabricated from PDMS by rapid prototyping techniques will control the polymerization process. It will also be appreciated that the flow reactor can be constructed by micromachining of a silicon substrate, as well as by means of several other methods. The geometry of the reactor is easily changed to accommodate many different flow profiles. One reactor geometry is shown in FIGS. 1 and 2. The geometry is prepared for the hydrodynamic focusing of liquid flow to prepare very small fibers. The dimensions of the reactor channels are roughly 100 microns. The liquid flow is controlled by external pumping such as a syringe pump. In one preferred embodiment, four different solutions are required in a particular geometry. The aqueous reactant is introduced at one point into the flow reactor. As discussed above, a monomer (amine coated nanoparticle) is dissolved in an basic aqueous solution. The second monomer (diacid chloride) is dissolved in an organic solvent such as hexane. This solution is introduced into the reactor at a second point.

The present invention, in one preferred embodiment, is a microfluidic flow reactor for the fabrication of polymeric fibers, the microfluidic flow reactor constructed of an elastomeric material, in one preferred embodiment poly(dimethylsiloxane) (PDMS). In such a microfluidic flow reactor, a network of microfluidic channels is designed in a computer assisted design (CAD) program. The design is converted into a transparency using a high-resolution printer; this transparency is then used as a mask in photolithography to create a master in positive relief photoresist. The elastomeric material, for example PDMS, is then cast against the master, yielding a polymeric replica containing a network of channels. The surface of this replica, and that of a flat slab of PDMS, are then oxdized in an oxygen plasma. These oxidized surfaces seal tightly and irreversibly when brought into conformal contact. The oxidized elastomeric material also seals irreversibly to other materials used in microfluidic systems, such as glass, silicon, silicon oxide, and oxidized polystyrene. A number of substrates for devices are, therefore, practical options.

Oxidation of the elastomeric material has an additional advantage in that it yields channels whose walls are negatively charged when in contact with neutral and basic aqueous solutions. These channels support electro-osmotic pumping and can be filled easily with liquids with high surface energies, especially water.

As an aspect of this invention, masters are constructed using a combination of high-resolution printing and contact photolithography—a process referred to as rapid prototyping of masters. This technique can be used to generate a variety of microstructures with dimensions >20 µm. In this technique, a CAD file is printed on a flexible transparency by using a commercial printer; this transparency is used as a mask in contact photolithography. After development, the pattern of photoresist is used as the master to cast replicas of PDMS.

A preferred aspect of the invention is the surface oxidation of the PDMS, both to make sealing straightforward and to support electro-osmotic flow (EOF). Enclosed channels are formed simply by oxidizing the PDMS replica containing a network of channels, and a second, flat piece of PDMS in a plasma discharge. Bringing the two oxidized PDMS surfaces into conformal contact forms a tight, irreversible seal. An important consequence of oxidizing the PDMS surfaces for microfluidic systems that use electro-osmotic pumping is that the walls of the channels present a layer of silanol (SiOH) groups to an aqueous solution in contact with them. These surfaces are charged ($SiO^-$) when the solution is neutral or basic, and so the channels support EOF toward the cathode.

An aspect of the present invention is the rapid fabrication of microfluidic systems in PDMS. First, a high-resolution transparency containing the design of the channels, created in a CAD program, is used as a mask in photolithography to produce a positive relief of photoresist on a silicon wafer. Next, glass posts are placed on the wafer to define reservoirs or loci for fluid inputs and outputs. Then a prepolymer of PDMS is cast onto the silicon wafer and cured at 65° C. for one (1) hour. Then, the polymer replica of the master containing a negative relief of channels is peeled away from the silicon wafer, and the glass posts are removed. Finally, the PDMS replica and a flat slab of PDMS are oxidized in a plasma discharge for one (1) minute. Plasma oxidation has two effects. First, when two oxidized PDMS surfaces are brought into conformal contact, an irreversible seal is formed between them. This seal defines the channels as four walls of oxidized PDMS. Second, silanol (SiOH) groups introduced onto the surface of the polymer ionize in neutral or basic aqueous solutions and support EOF in the channels.

Designs of channel networks were generated by using a computer drawing package. In one preferred embodiment, a 50 µm wide injection channel connects reservoirs for sample and buffer. This channel crosses the 50 µm wide separation channel that connects the two reservoirs in a 150 µm long double-T arrangement; this arrangement is used to inject sample into the separation channel. Transparencies of the designs are created and used as masks in contact photolithography to yield masters composed of a positive relief of photoresist on a silicon wafer. Using transparencies printed from a high-resolution printer, features in photoresist with widths >20 µm are rapidly and reliably constructed. By using different photoresists, features can be generated with thickness between 1 and 200 µm. In one preferred embodiment, a photoresist thickness of 55 µm is used to define the channel depth; this thickness can be reproduced within ±5%. The dimensions of features of photoresist that can be achieved by rapid prototyping are, therefore, well suited for fabricating masters for molding channels in polymers that can be used in microfluidic applications.

Rapid prototyping to create masters offers several advantages over the conventional photolithography and micromachining of silicon which has been used previously to create masters for molding polymeric microfluidic systems. First, transparencies take less time to produce (hours compared to days or week) and are substantially less expensive than chrome masks ($20 compared to $500-1500). Second, the development of photoresists to create a relief on silicon is easier and more flexible in the types of patterns that can be produced than the etching needed during micromachining of silicon. In particular, the orientation of features created by micromachining silicon is often limited by the crystallographic planes of silicon because of anisotropic etching. This property makes it difficult to create channels in microfluidic devices of arbitrary orientation or to create circular reservoirs. It is, however, straightforward to create features in photoresist that can be molded in polymer to yield channels of arbitrary orientation and circular reservoirs.

Posts are preferably placed on the master to define reservoirs for liquids. PDMS is then cast against the masters to yield elastomeric replicas containing networks of channels. The angle of the walls of the photoresist to the silicon substrate was close to 90°, so the channels in the PDMS replica are essentially rectangular. Scanning electron micrograph (SEM) images indicate that there is some roughness in the sides of the PDMS channels; this edge roughness arises from the limited resolution of the printing on the transparency.

To form enclosed channels, a PDMS replica containing a network of channels is sealed irreversibly to a flat slab of PDMS. Oxidizing both surfaces in a plasma discharge for 1 minute and bringing them into conformal contact, without added pressure, achieved this seal in seconds. The seal between the two pieces of PDMS was sufficiently strong that the substrates could not be peeled apart without failure in cohesion of the bulk PDMS. This strong seal enabled the filling of the microscopic channels easily by placing liquid in three of the reservoirs and applying vacuum on the fourth.

The nature of the strong bond between two pieces of oxidized PDMS results from the surface interaction. The advancing contact angle of water on PDMS oxidized for 1 minute is 30°, compared to 108° for untreated PDMS: oxidized PDMS has a hydrophilic surface. Static secondary ion mass spectrometry (SSIMS) indicates that the site of attack of the plasma is at the silicon atoms, and the fragments suggested that SiOH groups were at the surface. XPS revealed an increase in silicon and oxygen at the surface at the expense of carbon upon a plasma treatment. The ATR-IR spectrum of oxidized PDMS had a strong O—H stretching mode at 3400 $cm^{-1}$ and a Si—OH stretching mode at 908 $cm^{-1}$; oxidation also resulted in a weakening of the methyl modes.

This experimental evidence indicates that oxidizing PDMS in a plasma discharge converts —$O_nSi(CH_3)_2O$— groups at the surface to —$O_nSi(OH)_{4-n}$. The formation of bridging, covalent siloxane (Si—O—Si) bonds by a condensation reaction between the two PDMS substrates is the most likely explanation for the irreversible seal.

PDMS seals irreversibly to a range of materials other than itself, including glass, silicon, silicon oxide, quartz, silicon nitride, polyethylene, polystyrene, and glassy carbon; in all cases, both surfaces are cleaned and exposed to an oxygen plasma for 1 minute. Many of these materials are commonly used in microfluidic systems, so this sealing method provides a rapid and simple way to enclose microfluidic devices. The ability of oxidized PDMS to conform to surfaces over large areas, and to bring both surfaces into atomic contact further contributes to the success of sealing it to a wide range of substrates.

This method for sealing microfluidic systems made from PDMS is much simpler than others used commonly. Glass and Si/SiO$_2$ devices are sealed by either anodic or fusion bonding that require applying some combination of high pressures, temperatures, and voltages for an extended period (up to 18 hours). Plastic devices are usually sealed by heating two substrates to their softening temperatures while bringing them into contact. This heating process can distort the geometry of the channels and requires careful attention to conditions. The method of sealing PDMS devices described here retains the integrity of the channels, is carried out at room temperature and pressures, and is complete in seconds to minutes.

As discussed above, silanol groups are present on the walls of oxidized PDMS channels. When in contact with neutral or basic aqueous solutions, the silanol groups may deprotonate (SiO$^-$). Charged PDMS/silicate walls provide two main benefits for microfluidic systems over hydrophobic walls.

First, it is easy to fill oxidized PDMS channels with liquids. The high surface energy of oxidized PDMS means that polar liquids will wet more easily than native hydrophobic PDMS. Oxidized channels are, therefore, easier to fill than hydrophobic channels with liquids with high surface tensions, such as water. As a consequence, samples can be separated by capillary zone electrophoresis using a procedure that does not require the presence of a sieving matrix to reduce the surface tension of water and make it easier to fill hydrophobic channels. Bubble formation can be a problem in channels with hydrophobic walls because aqueous solutions had a tendency to de-wet from the surface of hydrophobic PDMS.

Second, oxidized PDMS channels support EOF toward the cathode. The direction of migration under an applied electric field of both a negatively charged molecule (fluorescein) and a positively charged molecule (4-(4-(diethylamino) styryl)-N-methylpyridinium iodide) in oxidized PDMS channels in 25 mM Tris-192 mM Gly buffer (pH 8.4) indicated that EOF was toward the cathode. This observation is consistent with the surface of oxidized PDMS being negatively charged.

The durability of the thin hydrophilic layer on PDMS produced by exposure to an oxygen plasma is also easily addressed. The contact angle of water on oxidized PDMS changes from 30° to 79° in 15 minutes if the samples are left open to the atmosphere; the contact angle returned (93°) almost to the value of native PDMS after 45 minutes in air. Oxidized PDMS is stable if placed under liquid immediately after oxidation; the advancing air-in-water contact angle of oxidized PDMS does not change appreciably over 80 minutes. The stability of the oxidized layer in the channels can be tested by measuring the mobility of fluorescein in a 5-cm-long oxidized PDMS channel over a period of 4 days. During this time, the channel undergoes intermittent electro-osmosis for a total of 8 hours under an applied voltage of 200 V/cm in 25 mM Tris-192 mM Gly buffer (pH 8.4) at 20° C. In the first 8 hours of the experiment during which an electric field was applied for a total of 3 hours, the mobility of fluorescein fluctuated by ±5% around its mean value. Over the next 4 days, the mobility of fluorescein increased steadily to a value 26% greater than its initial value. The increase in mobility suggests an increase in the rate of EOF, possibly caused by the hydrolysis of siloxane bonds in the oxidized layer by the alkaline buffer. Long operating lifetimes are possible with an internal standard to compensate for drift. Over a period of days, no loss in the polarity of the channels is observed.

It will be appreciated that there are two related, unique aspects of the invention both related to the process. First is the formation of a fiber at the interface of polymerization under flow conditions. This aspect could also be used to form other material stock shapes. Second is the use of channels combining size and flow rates to maintain low Reynolds numbers allowing maintenance of laminar flow within the reaction region. Polymer fibers will be formed utilizing this method to produce new optical, catalytic or enhanced mechanical properties. In addition, hydrodynamic focusing can be utilized to "decorate" the external surface of the fibers with various functionalities, as well as other modifications of the fiber material structure.

It will be appreciated that the present invention can be employed to furnish devices and system components that can be integrated into flexible or conformal electronic textile systems. Such systems provide a number of benefits, including functional devices at the fiber and yarn level; novel methods for component formation; information technology from previously unrecognized sources; materials synthesis so as to provide flexible or conformal electronic textile systems with novel electrical, optical, and mechanical capabilities; low cost manufacturing; nano-technology-based woven and non-woven textile circuits; and novel materials.

In the area of electronic textiles, there has been a surge of research and publicity in the past several years on "wearable computers" and "smart fabrics." See E. Post, M. Orth, P. Russo, N. Gershenfeld, "E-broidery: Design and fabrication of textile-based computing", IBM Systems Journal 39 (2000) 840 and P. Weiss, "Smart Outfit", Science News Vol. 156, No. 21, pg. 330. These types of new fabrics contain functional yarns and/or embedded or coated components which can be integrated into devices. Much of this work had involved simple miniaturization of standard electronic and optical components to wearable form. See Proceedings of the Fourth International Symposium on Wearable Computers (ISWC'00), 18-21 Oct. 2000, Atlanta, Ga., IEEE Computer Society.

But there have also been a number of developments in new materials and systems for electronic textiles. See D. Forrest "The Future Impact of Molecular Nanotechnology on Textile Technology and on the Textile Industry", presented at Discover Expo '95, Industrial Fabric & Equipment Exposition, Charlotte, N.C., October 1995. Research in this field is active in both academia and industry, with a number of companies offering fabrics with functions such as pressure or position sensing. For example, ElectroTextiles Company Limited, United Kingdom and Tactex Controls Inc. British Columbia, Canada both offer some form of electronic textiles. The functional parts of the yarns are often active components, include electrically conducting polymers, optical fibers with fiber Bragg gratings written directly into them, and chemical sensing optical fibers. See Mahmoud El-Sherif and Jianming Yuan, "Smart Fabrics with Embedded Fiber Optic Sensors for Detection of Biological Threats," Intelligent Textiles 2000 Conference, Providence, R.I., Jun. 20-21, 2000. Others contain passive elements like zeolite-embedded fibers, which perform functions without active feed-back, see, for example, BFF Nonwovens, United Kingdom.

The approach of the present invention is to incorporate nanoparticles in polymer matrices, thus, permitting the construction of new materials. The synthesis of polymer fibers is a well-established technique. See S. Warner "Fiber Science" Prentice Hall, 1995. However, attempts to embed nanoparticles in fibers have not been entirely successful. For example, in R. Balachandran, D. Pacheco, M. Lawandy, "Photonic textile fibers" Appl. Optics 35 (1996) 1991-4, it is reported that 250 nm diameter $TiO_2$ nanoparticles were embedded in fibers of nylon-6, Kevlar, polyester and other standard synthetic fiber materials. The nanoparticles, along with some laser dyes, were simply mixed into the resins and fibers (~200 μm diameter) were fabricated using standard extrusion methods (melt spinning).

In contrast, the focus of the present invention is on fiber component development utilizing a technology which produces nanofabricated fibers, filaments and yarns suitable for woven textile circuits, as well as films for use in textile manufacturing based on "non-woven" technologies. The present invention provides for incorporation of nanoparticles into these structures by means of a flow reactor and use of linking chemistries to ensure control over particle type, loading density, and spacing within the material matrix. The combination of the specialized reactor and chemistries results in a self-assembling matrix in the fiber or film. Based on this approach, one can produce fiber-, yarn-, or film-based electronic or optical components, as well as provide for integration of conventional electronic components in large-area textile-based systems such as uniforms, blankets, tents, parachutes, among others.

With film as the fabricated component, self-assembly at the matrix level is emphasized. With either fiber or yarn as the fabricated component, subsequent weaving permits assembly of the textile-based circuit. This approach is analogous to interconnect circuit design, resulting in integrated arrays of innate sensors for chemical warfare agent detection, targeting and bio-detection, among others.

The present invention provides a method for controlling material properties by means of nanometer scale science and engineering. An aspect of the present invention is the control of particle spacing in "composite" film structures by molecular manipulation. This is accomplished by means of two distinct nanometer scale phenomena. In the first, particles within the material film structures vary in size from on the order of microns to on the order of nanometers (at least three orders of magnitude, down to the molecular level). Second, spacing between particles can be controlled via molecular interactions, both specific and non-specific. Both of these strategies, as well as specific and non-specific molecular manipulation, can be employed with the method of the present invention.

It will be appreciated that the present invention can provide an array of structures, ranging from electrical and optical connectors (for example, wires, optical fibers, and waveguides) to passive and active devices. Another aspect of the present invention is the construction of system components, in which one fabricates fiber- or yarn-based sensors, organic LED's, solar cells, or antennae arrays. It will be appreciated that flexible battery technology can provide power for such applications. In addition, such systems can be readily re-configurable and highly redundant if desired.

Another aspect of the present invention is the low-cost fabrication of large-area, flexible, conformal information systems based on nano-technology. The present invention provides a method for fiber formation in which the electronic, optical, electro-optical and electro-mechanical properties of the fiber can be varied and adjusted as desired. An application of the present invention is the construction of electronic textiles which can then be used as components of electronics and information technology, chemical and biological detection, and health monitoring, incorporating this functionality into objects such as uniforms and tents.

The present invention is based upon large-scale production of nanoparticles, molecular manipulation, control of fabrication and derivatization on a nanometer scale, nanometer-scale control of electronic and optical properties, and computer-controlled laminar flow reactor.

The present invention additionally comprises electronic textile technology for large-area woven and non-woven circuits. This aspect of the present invention comprises materials and processes permitting device integration at fiber, yarn, and fabric levels. Thus, one aspect of the present invention is a laminar flow reactor for production of fibers. Another aspect of the present invention is a conductive fiber. Such a fiber can serve as the base device for electrical interconnection of all active and passive devices within a textile-based circuit.

Still another aspect of the present invention is an electrically insulating fiber. It will be appreciated that the use of insulating and conducting fibers in combination can provide inductive circuits, such as found in RLC networks.

Another aspect of the present invention is a fiber based capacitor, having conducting ends with an insulating segment between the ends.

Yet another aspect of the present invention is a segmented fiber. Such a fiber permits the construction of intra-fiber integrated devices, for example series capacitors within a fiber. It will be appreciated that the present invention permits interconnect structures, as well as arrayed devices.

FIG. 1 shows a laminar flow reactor constructed of polydimethylsiloxane (PDMS). The reactor shown has four inputs and one output. The inputs are microcapillaries that provide connections from the pump to the flow reactor. The two inputs capillaries on the far left (diagonal inputs) each pro-vide a different reactant. FIG. 2 is a video frame taken through a microscope objective, a close-up of the reaction region during fiber production. The two reactants are introduced into the flow reactor via the microcapillary entering in the "V" shaped channels labeled 1 and 2. The reactants are hydrodynamically focused by the vertical inputs marked 3, which keep the fluid focused to the center of the reaction chamber. Utilizing laminar flow, where no mixing occurs, a reaction at the interface of the two reactants forms the product which is pushed out the long channel to the right, marked in two places along its length as 4 in Figure D-2. The specific reaction portrayed in these figures is a nylon fiber being formed in the flow reactor. The fiber is the result of the reaction between 1,6 hexanediamine at high pH in water as one reactant (1) and subacoyl chloride in hexane as the other reactant (2). The flow was hydrodynamically focused on the water side with water and on the hexane side with pure hexane (3). The fiber being formed is a thin white line of nylon and is indicated at point (4) along the reaction chamber.

It will be appreciated that the present invention will permit surface modifications of microstructures, nano-structures and surfaces. In some preferred embodiments, these modifications will involve silane and thiol based modifications. Monitoring of the surface modification of nanoparticles is relatively straightforward utilizing Fourier Transform Infrared (FTIR) Spectroscopy and dynamic light scattering (DLS) to monitor extent of reaction and particle size.

This technology allows for the formation of fibers, filaments and films containing controlled concentration of nanoparticles as well as controlled spacing between the nanoparticles. This manufacturing control at the particle level will result in fabric materials for both woven and non-woven textiles with uniquely tailorable electrical and optical properties. This makes possible electro-optic, electromechanical, and even photomechanical devices within the circuits.

Relative to conventional approaches of fiber formation, the method of the present invention provides tailorability of individual fibers and subsequent utilization in yarn design. This technology permits simultaneous production of numerous fibers using inexpensive reactor arrays.

The present invention is premised upon advances in modeling, Microsystems, materials, characterization, and manufacturing processes from the textile industry so as to provide a novel method for fiber development. The present invention provides, in a preferred embodiment, a process to make fibers that have regions of conducting and nonconducting nanoparticles via a flow reactor. It will be appreciated that this technology is also applicable to filament and film production.

It will be appreciated that the design of the reactor can be modeled so as to provide the optimal flow configurations and reactor geometry. In this reactor design one relies upon laminar flow and hydrodynamic focusing to confine the reactants to the center of the reactor. The optimal flow rates are determined for the reactor geometry based on maintaining laminar flow. Additionally, diffusion coefficients of reactants within the channel and confines of the focused liquid will contribute to the modeling of reactions in the flow.

Electrical elements such as resistors, capacitors, and inductors can be constructed in the fiber and yarn. It will appreciated that molecular bonding and polymerization chemistry can be modeled using either CAChe or Chem 3D. Such data permits calculation of the particle spacing and chemical bonding geometries. Spectroscopy can also be employed and correlated with such data to confirm characterization.

Figure 3:
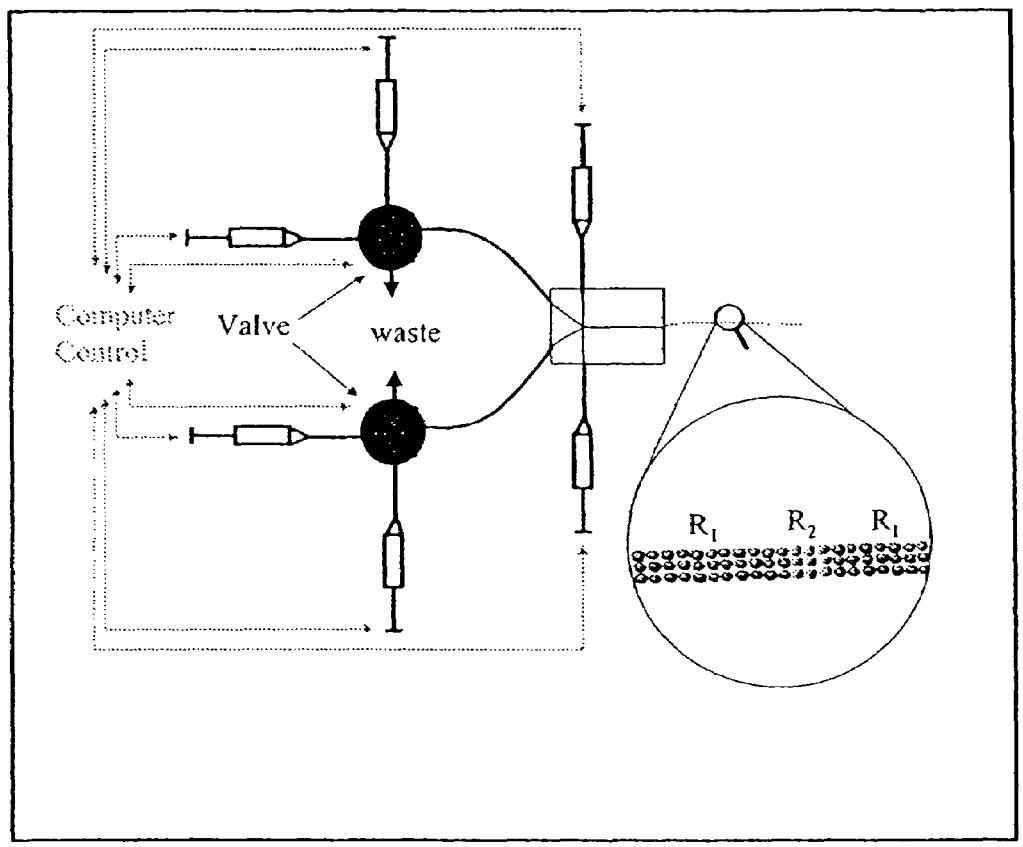
FIG. 3 is a schematic of a laminar flow reactor with computer-controlled pumps and valves.

It will be appreciated that the laminar flow reactor can be constructed from polydimethylsiloxane (PDMS), as well as other polymers and silicon depending on the geometries and temperatures desired for reactor design. The fabricated reactor is connected to pumps and valves that control the reactants. A schematic of this system is shown in FIG. 3. In an additional aspect of the present a massively parallel array is provided, permitting synthesis of hundred or thousands of fibers simultaneously.

To produce a fiber with varying electrical or optical properties, one can surface derivatize nanoparticles. Particularly appropriate nanoparticles include metal oxides, metals, and surface hydroxyl-terminated nanoparticles. The metal oxides and surface hydroxyl-terminated nanoparticles can be modified with organosilanes. Metals, such as Au, Ag, and Cu, can be modified with thiol derivatives. These surface modifications permit a common liquid/particle interface such as an organic solvent/amine terminated coating. It will be appreciated that a colloidal system can also be employed.

It will be appreciated that the polymerization of the nanoparticles can be accomplished by means of a number of polymerization reactions. Particularly appropriate polymerization reactions include heterochain thermoplastic synthesis and cationic polymerization. Selection of the appropriate polymerization reaction is based upon the manufacturability of yarns and textiles made from the fibers, as well as component functionality.

Every step of the fiber formation will need characterization. Dynamic light scattering will prove in-valuable for determining the size of the particles included in the actual reactions. COTS nanoparticles agglomerate extensively and will need to be broken down to individual particles using ultra-sound or homogenization. Nanoparticles may also be synthesized via sol-gel chemistry or by well known solution chemistry routes for the preparation of gold colloids, and newer micro-emulsion methods for synthesis of nanoparticles of conducting polymers such as polyanaline and polypyrrole. But these processes have to be monitored to obtain the correct particle size. FTIR and RAMAN spectroscopy will be necessary to understand the extent of reaction of surface modifications of particles and the polymerization reactions. Both nanoparticle loaded and polymerized fibers will be characterized to determine their electrical properties. The electrical properties to be determined are resistance, capacitance, inductance and current capacity. We will wrap conducting and non-conducting fibers in order to generate an inductor like structure for measuring those properties. Optical properties of the basic materials, such as transmission, reflection, and absorption will be characterized.

Various preferred embodiments of the invention have been described in fulfillment of the various objects of the invention. It should be recognized that these embodiments are merely illustrative of the principles of the invention. Numerous modifications and adaptations thereof will be readily apparent to those skilled in the art without departing from the spirit and scope of the present invention.

What is claimed:

1. A composition of matter comprising a polymer fiber with a plurality of controllably spaced nanoparticles integrated into the polymer fiber; wherein the nanoparticles are derivatized to function as a monomer in the polymer fiber.

2. The polymer fiber according to claim 1, wherein the nanoparticles are derivatized by reaction with a silane.

3. The polymer fiber according to claim 1, wherein the nanoparticles are comprised of a metal.

4. The polymer fiber according to claim 3, wherein the metal is selected from the group consisting of Pd, Cu, Fe, Ag and Ni.

5. The polymer fiber according to claim 1, wherein the nanoparticles are comprised of an intermetallic compound.

6. The polymer fiber according to claim 5, wherein the intermetallic compound is selected from the group consisting of $Al_{52}Ti_{48}$.

7. The polymer fiber according to claim 1, wherein the nanoparticles are comprised of a metal oxide.

8. The polymer fiber according to claim 7, wherein the metal oxide is selected from the group consisting of $TiO_2$, $Y_2O_3$, ZnO, MgO, and $Al_2O_3$.

9. The polymer fiber according to claim 1, wherein the fiber is an electrical conductor.

10. The polymer fiber according to claim 1, wherein the fiber is an electrical insulator.

* * * * *